May 1, 1928.
J. POPE
1,668,285
ELECTRIC POWER GENERATING SYSTEM
Filed Jan. 17, 1923
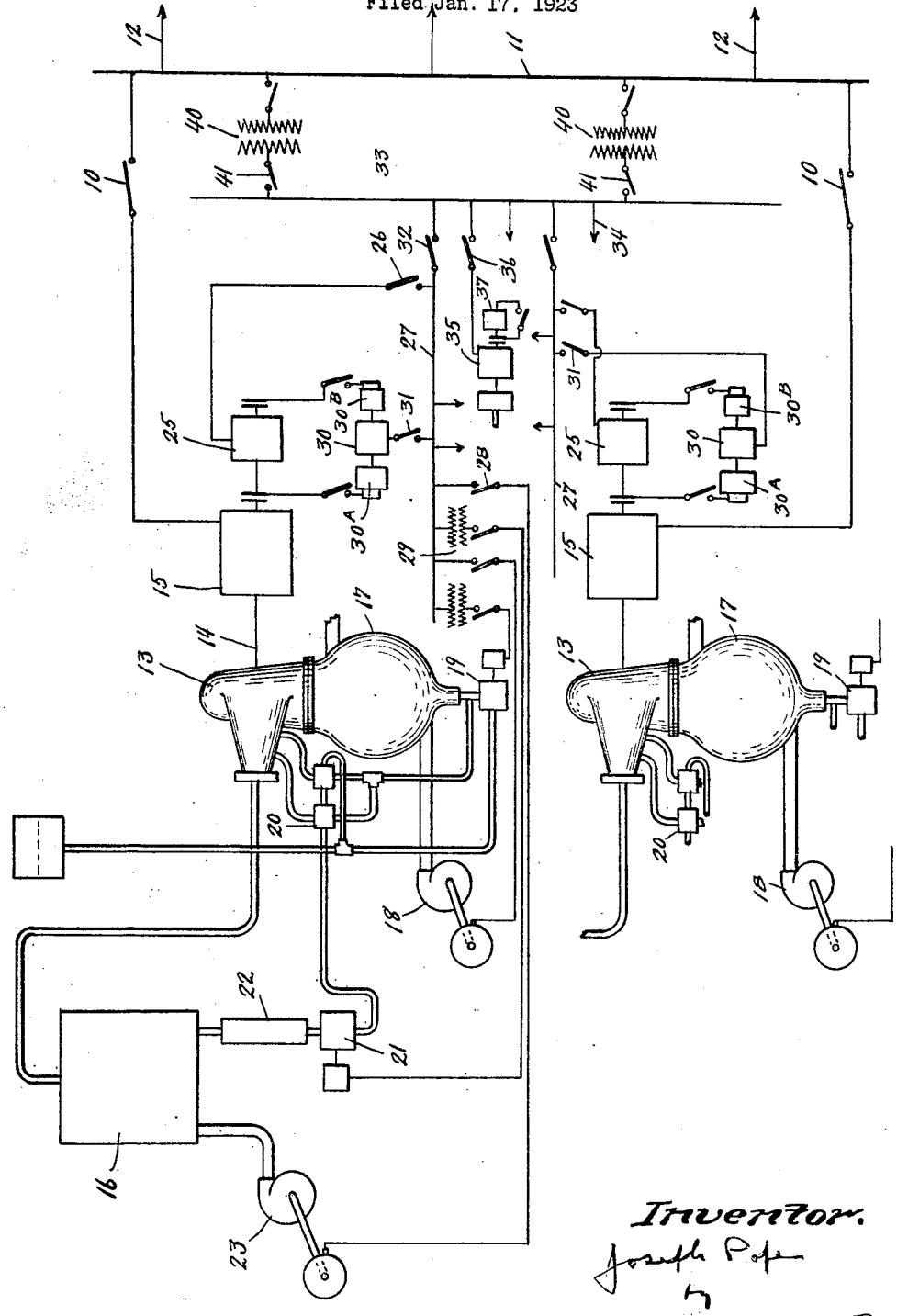
Inventor.
Joseph Pope
by Patented May 1, 1928.

1,668,285

UNITED STATES PATENT OFFICE.

JOSEPH POPE, OF BROOKLINE, MASSACHUSETTS, ASSIGNOR TO STONE & WEBSTER, INC., OF BOSTON, MASSACHUSETTS, A CORPORATION OF MASSACHUSETTS.

ELECTRIC POWER-GENERATING SYSTEM.

Application filed January 17, 1923. Serial No. 613,252.

This invention relates to electric power generating systems of relatively large output capacity and has particular reference to generating systems wherein steam turbines are utilized as the prime movers.

A steam turbine electric generating plant, in addition to the steam boiler, turbine and the electric generator, which latter is directly coupled to the steam turbine, has a number of auxiliary power consuming units, which may to advantage be electrically operated, which are essential to maintain continuity of operation of the steam turbine unit; and these auxiliary power consuming devices may include air pumps, water pumps, blowers and the like. In a large power plant, the power required to operate the auxiliary devices may be considerable, although it may be small compared to the output of the plant. For instance, a power plant developing 30,000 K. W. may require approximately 2,000 K. W. to operate the auxiliary power consuming devices. Heretofore, it has been common practice to supply electric power for operating the auxiliary devices either from an auxiliary turbo-generator unit or directly from the main power bus of the station through suitable transforming or converting devices. The exhaust steam from the auxiliary turbine commonly has been used for heating boiler feed water and, also, partially expanded steam extracted from one or more points in the main turbine frequently has been used for that purpose.

It is highly desirable to maintain continuity of operation of the auxiliary devices as the failure of one or more of said devices may cause the entire plant to be shut down and, in this respect, the method of furnishing power to said auxiliary devices from the main bus bar of the station is not desirable since a disturbance upon the transmission lines connected with said bus may effect interruption of the current supply to the auxiliary devices. It is well known that electrical energy may be generated in a more economical manner with a large turbo-generator unit than with a small turbo-generator unit and, consequently, while an auxiliary turbo-generator unit provides increased reliability of operation of the auxiliary devices, the expense of operation, at best, is substantially greater than the expense of operating the devices directly from the main power bus.

An object of this invention is to provide means for supplying the auxiliary power-consuming devices of a steam turbo-generator power plant with power as economically as that generated from the main turbo-generator and in as a reliable a manner as that supplied from a separate or auxiliary turbo-generator unit, whereby to obtain a maximum of reliability and economy.

In carrying out my invention, I provide a directly-coupled steam turbine and main electric generator. The generator should have a capacity sufficient to meet the load requirements. The steam turbine should have a capacity sufficient to operate the main generator under the load requirements and to have an additional capacity great enough to supply the auxiliary power consuming devices of the plant. An auxiliary electric generator is directly-coupled to the common shaft of the steam turbine and the main generator, and said auxiliary generator is arranged to supply the power necessary to operate the various auxiliary power consuming devices. With this arrangement, the auxiliary power is generated practically as economically as the main power and is as reliable as that supplied from an auxiliary turbo-generator unit for it is obvious that auxiliary power will be available whenever the main turbo-generator set is in operation; and disturbances in the transmission or distribution system connected with the main generator will have no effect upon the supply of energy furnished by the auxiliary generator.

A further object is generally to improve the construction and operation of electric generating systems, by simplifying piping systems, and by providing means of obtaining auxiliary power not otherwise conveniently or satisfactorily obtained, when operating steam pressure and temperatures are high.

Other advantages appear from the specification and drawings.

The figure is a diagrammatic representation of the elements of an electric generating plant embodying my invention.

As here shown, I have illustrated the power plant as comprising two power generating units (although there may be more than two units) which are adapted to be connected through switches 10 to the main power bus 11 from which various power transmitting lines 12 may extend. Both power generating units may be substantially indentical and for this reason, I have omitted, in one unit, certain pieces of apparatus which are illustrated in the other unit. Each power unit may comprise a main steam turbine 13 which is directly connected through the shaft 14 with the main electric generator 15, and said generator may be, and preferably is, a polyphase alternating current generator of suitable capacity and characteristics. For the purpose of example, said generator may have a capacity of 30,000 K. W. and deliver a three-phase, sixty cycle current at 13,200 volts. The steam turbine may be supplied with high pressure steam from the boiler 16 and the exhaust steam may be condensed in the condenser 17.

Various auxiliary power consuming devices are associated with the generating system. A pump 18 may be arranged to circulate a cooling medium through the condenser 17. A hot well pump 19 may be arranged to withdraw the condensed steam from the condenser and force it through the preheaters 20 which may be heated by partially expanded steam from the main turbine in any suitable manner not shown. A boiler feed pump 21 may withdraw the partially heated water from the preheaters 20 and force it through the economizer 22 into the boiler 16. A fan or blower 23 may be associated with the furnace of the boiler 16 to supply air for combustion. A direct current generator $30^a$ is provided to excite the field of the main generator 15 and another generator $30^b$ for exciting the field of the auxiliary generator 25. These may be driven by separate motors or by the same motor 30 which may receive its power through a suitable switch 31. There are also usually other auxiliary power consuming devices such as smaller fans, pumps, etc., which must be supplied with power for operation; and all of the auxiliary power-consuming devices are or may be operated by suitable electric motors.

In accordance with this invention, I provide an auxiliary electric generator 25 for supplying the auxiliary devices with power and I couple said auxiliary generator directly to the shaft 14 of the main turbo-generator unit so that said auxiliary generator is driven directly by the main turbine 13. With this arrangement, the auxiliary power is generated practically as economically as is the main power. The auxiliary generator may be of any suitable capacity and may have any desirable characteristics. For instance, it may have a capacity of, say, 2,000 K. W., and may deliver three phase, sixty cycle alternating current at, say, 2,300 volts.

Preferably, said auxiliary generator is connected mechanically with the main generator in such a way that the currents in both generators are electrically in phase.

The auxiliary generator 25 is adapted to be connected through a switch 26 with an auxiliary power bus 27 and is adapted to supply current thereto. The various auxiliary power consuming devices 18, 19, 21, etc., are or may be connected, through suitable switches 28 and transforming or converting devices 29, if necessary, to said auxiliary bus 27. This arrangement provides a reliability of operation of the auxiliary power devices which can not be obtained when said devices are supplied with energy from the main power bus and it also provides for an economy of operation of the auxiliary devices which can not be obtained when said devices are supplied with energy from a small auxiliary turbo-generator unit.

Preferably, the auxiliary buses 27 of the two or more turbo-generator units may be connected through suitable switches 32 to an auxiliary tie bus 33 whereby to permit the parallel operation of the auxiliary generators of each unit and from which through suitable leads 34 other devices may be supplied with energy.

For supplying current to the various auxiliary devices of the power generating units, when said generating units are being first set in operation, an auxiliary turbo-generator unit or "house" turbine 35 may be provided which is adapted to be connected to the auxiliary tie bus 33 through a suitable switch 36 although, if the power plant has but one power generating unit, it may be connected instead to the auxiliary bus 27. Said house turbine 35 may be provided with a small direct current generator 37 directly connected thereto for the purpose of supplying exciting current to the fields of the alternating current generator. The exciter generator should not be adapted to supply current to any auxiliary devices. After the main power generating units have been brought into operation, the house turbine may be shut down and disconnected from the auxiliary bus system.

If desired, the auxiliary bus system may be arranged for connection with the main bus 11 through suitable transforming devices 40 and switches 41 so that upon occasion, the auxiliary power consuming devices may be operated supplementarily from the main bus. It is for the purpose of permitting connection in this manner that the windings of the main and auxiliary generators are arranged to supply currents electrically in phase with each other. It is not intended that this connection be a permanent one, but is to be used for short periods only, to provide an alternative method of starting the auxiliary devices of a generating unit which is to be placed in service.

I claim:

A power generating system comprising the combination of a steam turbine and main high-tension alternating current generator directly connected to the turbine shaft, a main high-tension power bus fed by said generator, a steam boiler arranged to supply steam to said turbine, auxiliary power-consuming devices essential to the generation of power associated with said system, an auxiliary low-tension power bus arranged to feed said auxiliary power consuming devices, means to supply power to said devices comprising an auxiliary low-tension alternating current generator directly connected mechanically to the shaft of said turbine and arranged electrically in phase with said main high tension generator and connected with said auxiliary power bus, and supplemental means to feed said auxiliary power consuming devices comprising transforming devices connecting said main high-tension power bus and auxiliary low-tension power bus.

In testimony whereof, I have signed my name to this specification.

JOSEPH POPE.